UNITED STATES PATENT OFFICE.

LEO WASHBURN SHULL, OF TOLEDO, OHIO, ASSIGNOR TO THE ALLEN FILTER COMPANY, OF TOLEDO, OHIO, A CORPORATION OF OHIO.

FILTERING COMPOUND.

1,336,591.     Specification of Letters Patent.     Patented Apr. 13, 1920.

No Drawing.     Application filed November 1, 1916. Serial No. 128,856.

*To all whom it may concern:*

Be it known that I, LEO WASHBURN SHULL, a citizen of the United States, and resident of Toledo, in the county of Lucas and State of Ohio, have invented certain new and useful Filtering Compounds, of which the following is a specification.

The means hitherto employed for filtering water ordinarily consist in the use of burned brick, powdered substances, and various other materials, but which, either from the character of the materials themselves or from the manner in which they are prepared or compounded, are not satisfactory where great thoroughness in filtering is requisite. However efficient the named substances may be for removing visible impurities, they do not retain all germs or microbes or extremely small organisms which are held in suspension in the water, or other liquid, as for example, infected blood taken from human beings or animals, or generally any blood infected with microbes. Such filtering materials are also ineffective for removing the destroyed germs from wines, vinegars, beer and other like beverages, which have first been subjected to a certain degree of heat for the purpose of destroying such germs.

My invention is designed more completely to hold back and retain such germs or microorganisms, and it consists of a compound to be used for filtering water, wines, beverages and all liquids generally, and specially for obtaining blood serums.

The compound is formed substantially of American or other kieselguhr with a certain percentage of asbestos, and whiting (or an equivalent as hereinafter named) and treated as hereinafter described.

The kieselguhr is ground to a fine powder in any suitable mill and properly mixed with the other chemicals herein mentioned or their equivalent, and water, and subjected to a high degree of heat in any suitable kiln.

The proportions are from 60 to 80% of kieselguhr, 10 to 30% of asbestos and 10 to 15% of whiting or its equivalents. These proportions may however be varied more or less thereby varying the porosity, hardness and other properties of the finished material. I wish it to be understood that I do not limit myself to the above named substances, for the same or similar results may be obtained by using, for instance, lime, oxid of aluminum, chlorid of magnesia, or its equivalents, instead of whiting. By an equivalent of whiting I mean any of the above specified, or other substances which will act as a suitable binder before the compound is fired and are so changed by the high temperature to which the mixture is subjected in making the filtering compound that they render the compound porous. The whiting or its equivalent when mixed with the other ingredients, including water, acts as a binder for the composition thus formed. This binder consisting mainly of calcium hydroxid ($CaH_2O_2$), when subjected to the high temperature of the fixing process, loses its water and changes to calcium oxid ($CaO$). When the compound is later treated with water this oxid is changed to a hydrate and the greater portion thereof washed away, leaving the highly porous kieselghur forming the main ingredient or body of the filter and the asbestos forming a binder.

The above described compound is particularly adapted for filtering liquids under pressure owing to its being porous to a large degree, and for this purpose it may be used with any suitable filtering apparatus.

The method of manufacturing the filtering bodies may consist in mixing the ingredients, each in the form of a fine powder, with a small proportion of water added, and then subjecting the mixture to high pressure, or casting, molding, or turning. The filtering body thus produced is then baked or burned in a kiln in the usual way, the temperature ranging from 1800 degrees to 3000 degrees Fahrenheit. A higher temperature is fatal as it causes the material to disintegrate and renders it almost useless. A lower temperature is insufficient to cement the material together and properly harden the compound. The filtering body thus obtained is homogeneous and fulfils the required conditions for filtering the hereinbefore mentioned substances, and thereby obtaining the results herein specified.

I do not wish to be understood as laying claim, broadly, to the materials hereinbefore mentioned as a filtering compound, but only when they are combined and treated as above specified.

What I claim is:—

1. A filtering compound consisting of a porous, homogeneous substance formed of kieselguhr, asbestos, and a third element, all reduced to a fine powder and intimately mixed, and then subjected to a high temperature, said third element being a material which is chemically changed and reduced in bulk by said heat, whereby the compound is rendered porous.

2. A filtering compound formed of a mixture of kieselguhr, asbestos, and whiting, reduced to a solid, porous, homogeneous mass by subjecting the mixture to a temperature between 1800 and 3000 degrees Fahrenheit.

3. A filtering compound formed of a mixture of kieselguhr, asbestos and whiting, reduced to a solid, porous, homogeneous mass by subjecting the mixture to a high temperature, the ingredients being in the proportion of 60 to 80 per cent. kieselguhr, 10 to 30 per cent. asbestos, and 10 to 15 per cent. whiting.

4. A filtering compound formed of a mixture of kieselguhr, asbestos and whiting, reduced to a solid, porous, homogeneous mass by subjecting the mixture to a high temperature, the ingredients being proportioned, so that more than half of the mixture is kieselguhr, less than a third is asbestos, and a small amount is whiting.

5. A filtering compound formed of a mixture of kieselguhr, asbestos and whiting, reduced to a solid, porous, homogeneous mass by subjecting the mixture to a high temperature, the proportion of the ingredients being more than 50% kieselguhr and the remainder asbestos and whiting.

6. The process of forming a filtering compound which consists in mixing kieselguhr, asbestos and whiting each in the form of a fine powder, with water added, subjecting the mixture to high pressure, and then firing the mixture at a temperature which will drive off the water from the calcium hydroxid.

Signed at Toledo in the county of Lucas and State of Ohio, this 30th day of October A. D., 1916.

LEO WASHBURN SHULL.

Witnesses:
C. B. RAIRDON,
JOHN F. RULE.